US010223059B2

(12) United States Patent
Watanabe

(10) Patent No.: US 10,223,059 B2
(45) Date of Patent: Mar. 5, 2019

(54) BENDABLE DISPLAY PANELS WITH COLOR FLEXIBLE CONNECTION SUBSTRATE BETWEEN BENDABLE DISPLAY PANELS

(71) Applicant: Sharp Kabushiki Kaisha, Sakai, Osaka (JP)

(72) Inventor: Hisashi Watanabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 87 days.

(21) Appl. No.: 15/500,567

(22) PCT Filed: Jul. 31, 2015

(86) PCT No.: PCT/JP2015/071858
§ 371 (c)(1),
(2) Date: Jan. 31, 2017

(87) PCT Pub. No.: WO2016/021512
PCT Pub. Date: Feb. 11, 2016

(65) Prior Publication Data
US 2017/0228209 A1 Aug. 10, 2017

(30) Foreign Application Priority Data
Aug. 6, 2014 (JP) ................. 2014-160530

(51) Int. Cl.
*G09G 3/36* (2006.01)
*G06F 3/14* (2006.01)
(Continued)

(52) U.S. Cl.
CPC ........ *G06F 3/1438* (2013.01); *G02F 1/13336* (2013.01); *G02F 1/13452* (2013.01);
(Continued)

(58) Field of Classification Search
CPC .... G06F 1/1681; G06F 1/1616; G06F 3/1438; G06F 1/1601; G06F 3/1446;
(Continued)

(56) References Cited
U.S. PATENT DOCUMENTS

| 6,483,482 | B1 * | 11/2002 | Kim | .................... | G02F 1/13336 |
|  |  |  |  |  | 345/1.1 |
| 2010/0134743 | A1 * | 6/2010 | Shin | ........................ | G02F 1/13 |
|  |  |  |  |  | 349/143 |
| 2010/0277443 | A1 * | 11/2010 | Yamazaki | ............. | G06F 1/1616 |
|  |  |  |  |  | 345/204 |

FOREIGN PATENT DOCUMENTS

| JP | 59-94781 A | 5/1984 |
| JP | 62-111239 A | 5/1987 |

(Continued)

OTHER PUBLICATIONS

Official Communication issued in International Patent Application No. PCT/JP2015/071858, dated Oct. 20, 2015.

*Primary Examiner* — Jonathan A Boyd
*Assistant Examiner* — James S Nokham
(74) *Attorney, Agent, or Firm* — Keating & Bennett, LLP

(57) ABSTRACT

Provided is a configuration of a display device that can have a narrower frame. A display device (1) includes a first display unit (11) including a first substrate (111); a second display unit (12) including a second substrate (121) that is arranged so as to be adjacent to the first substrate (111) in an in-plane direction of the first substrate (111); a first line group (1171) that supplies a signal to the first display unit (11), the first line group (1171) passing through between the first substrate (111) and the second substrate (121); and a second line group (1271) that supplies a signal to the second display unit (12), the second line group (1271) passing through between the first substrate (111) and the second substrate (121). The first display unit (11) includes a mount- (Continued)

ing area to which the first line group (1171) is connected, in a part that is opposed to the second display unit (12), and the second display unit (12) includes a mounting area to which the second line group (1271) is connected, in a part that is opposed to the first display unit (11).

7 Claims, 13 Drawing Sheets

(51) Int. Cl.
  *G06F 1/16* (2006.01)
  *G09F 23/06* (2006.01)
  *G09G 3/20* (2006.01)
  *G02F 1/1333* (2006.01)
  *G02F 1/1345* (2006.01)

(52) U.S. Cl.
  CPC .......... *G06F 1/1601* (2013.01); *G06F 3/1446* (2013.01); *G09F 23/06* (2013.01); *G09G 3/2092* (2013.01); *G09G 3/36* (2013.01); *G02F 2201/56* (2013.01); *G09G 2300/026* (2013.01); *G09G 2300/04* (2013.01)

(58) Field of Classification Search
  CPC ........ H01L 51/007; G09G 3/04; G09G 23/06; G09G 3/2092; G09G 3/36; G09G 2300/026; G09G 2300/04; G02F 1/13336; G02F 1/13452; G02F 2201/56
  See application file for complete search history.

(56) References Cited

FOREIGN PATENT DOCUMENTS

| | | |
|---|---|---|
| JP | 03-63185 U | 6/1991 |
| JP | 06-242456 A | 9/1994 |
| JP | 2006-276359 A | 10/2006 |
| JP | 2008-191502 A | 8/2008 |
| JP | 2009-069768 A | 4/2009 |

\* cited by examiner

BENDABLE DISPLAY PANELS WITH COLOR FLEXIBLE CONNECTION SUBSTRATE BETWEEN BENDABLE DISPLAY PANELS

TECHNICAL FIELD

The present invention relates to a display device, and a device including the same.

BACKGROUND ART

From the viewpoint of space saving and design, a display device is requested to have an even further narrower frame. In addition, as a display device is used for a variety of purposes, the demand for display devices in shapes different from the conventional rectangular shape is increasing.

JP-A-2006-276359 and JP-A-2009-69768 disclose a liquid crystal display device having a display area in a circular or oval shape.

SUMMARY OF THE INVENTION

To a display device, a signal generation circuit has to be connected. The display device, for example, has a flexible substrate mounted on a peripheral part thereof. The flexible substrate is bent toward the back surface of the display device, so as to be connected to the signal generation circuit provided on the back surface of the display device. The display device, therefore, has to have an area in the peripheral part thereof where the flexible substrate is to be mounted, and it is difficult to make the frame narrower beyond a certain extend. Further, since the flexible substrate can be bent only along a straight-line edge, the flexible substrate cannot have an arbitrary outer shape. For example, even if the display area is in a circular shape, the outer shape thereof cannot be in a completely circular shape, since it is necessary to provide a straight-line portion somewhere in the peripheral part. If the outer shape of the display device cannot be selected freely, there are consequently many limitations on the design and mechanism of the product. Therefore, this has been a problem to be solved.

It is an object of the present invention to provide a configuration of a display device that can have a narrower frame.

A display device disclosed herein includes a first display unit including a first substrate; a second display unit including a second substrate that is arranged so as to be adjacent to the first substrate in an in-plane direction of the first substrate; a first line group that supplies a signal to the first display unit, the first line group passing through between the first substrate and the second substrate; and a second line group that supplies a signal to the second display unit, the second line group passing through between the first substrate and the second substrate. The first display unit includes a mounting area to which the first line group is connected, in a part that is opposed to the second display unit, and the second display unit includes a mounting area to which the second line group is connected, in a part that is opposed to the first display unit.

With the present invention, a configuration of a display device that can have a narrower frame is obtained.

MODE FOR CARRYING OUT THE INVENTION

Figure 1:
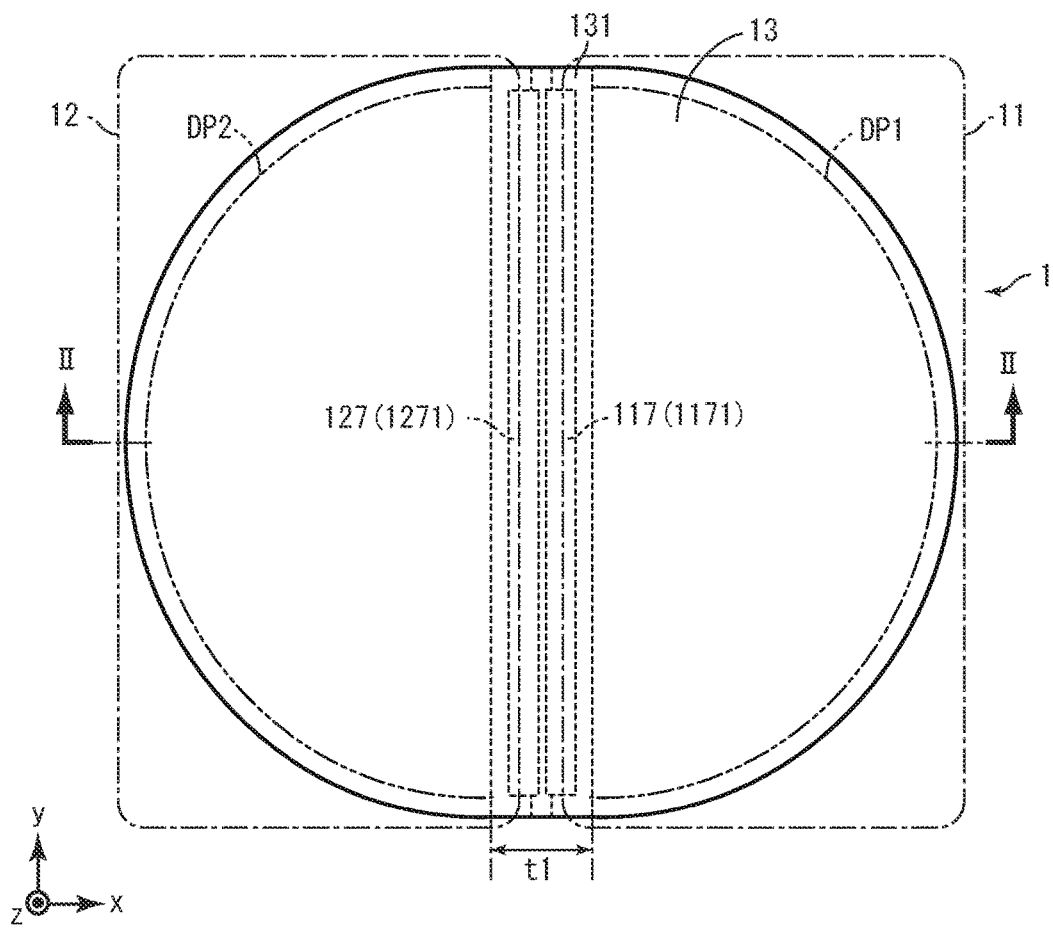
FIG. 1 is a plan view of a display device according to Embodiment 1 of the present invention, viewed from a viewer side.

A display device according to one embodiment of the present invention includes a first display unit including a first substrate; a second display unit including a second substrate that is arranged so as to be adjacent to the first substrate in an in-plane direction of the first substrate; a first line group that supplies a signal to the first display unit, the first line group passing through between the first substrate and the second substrate; and a second line group that supplies a signal to the second display unit, the second line group passing through between the first substrate and the second substrate. The first display unit includes a mounting area to which the first line group is connected, in a part that is opposed to the second display unit, and the second display unit includes a mounting area to which the second line group is connected, in a part that is opposed to the first display unit (the first configuration).

According to the above-described configuration, the first line group and the second line group pass through between the first substrate and the second substrate that are arranged so as to be adjacent in an in-plane direction, and are connected to portions of the first display unit and the second display unit that are opposed to each other. In other words, the first line group and the second line group are connected from the inside of the display device. This makes it unnecessary to ensure areas on an outer circumference of the display device for the connection of the first line group and the second line group. This allows the display device to have a narrower frame. Further, since the outer circumference of the display device can be formed in an arbitrary shape, the outer shape can be formed in, for example, a circular shape.

In the first configuration described above, preferably, the display device further includes a translucent front panel that is arranged on a viewer side with respect to the first display unit and the second display unit, so as to cover the first display unit and the second display unit (the second configuration).

The above-described configuration allows the two display units to have a uniform depth, which can improve the appearance of the display device.

In the second configuration described above, preferably, the display device further includes a colored section that is formed on the front panel, the colored section being formed between a display area of the first display unit and a display area of the second display unit, when viewed in a plan view (the third configuration).

The above-described configuration makes it possible to make the mounting areas to which the first line group, second line group, and the like are connected invisible to a viewer.

In any one of the first to third configurations described above, the display device may further include a first flexible substrate on which the first line group is formed, and a second flexible substrate on which the second line group is formed, wherein the first substrate includes a straight-line portion along an outline thereof, the first flexible substrate is arranged along an edge of the first substrate that includes the straight-line portion, the second substrate includes a straight-line portion along an outline thereof, and the second flexible substrate is arranged along an edge of the second substrate that includes the straight-line portion (the fourth configuration).

The fourth configuration described above may be such that the first flexible substrate is connected to the first substrate, and the second flexible substrate is connected to the second substrate (the fifth configuration).

The fifth configuration described above may be such that the first flexible substrate is arranged so as to intersect with a virtual line obtained by extending a line along the straight-line portion of the second substrate, and the second flexible substrate is arranged so as to intersect with a virtual line obtained by extending a line along the straight-line portion of the first substrate (the sixth configuration).

According to the above-described configuration, the first flexible substrate and the second flexible substrate are arranged alternately in an in-plane direction of the first substrate and the second substrate. The first flexible substrate and the second flexible substrate therefore can be arranged so as to partially overlap when viewed in the predetermined in-plane direction. This makes it possible to make the mounting areas smaller.

The fourth configuration described above may be such that the first display unit further includes a first counter substrate that is arranged on a viewer side with respect to the first substrate, so as to be opposed to the first substrate; the second display unit further includes a second counter substrate that is arranged on a viewer side with respect to the second substrate, so as to be opposed to the second substrate; the first flexible substrate is connected to the first substrate; and the second flexible substrate is connected to the second counter substrate (the seventh configuration).

The above-described configuration allows the first flexible substrate and the second flexible substrate to be arranged so as to partially overlap when viewed in a plan view. This makes it possible to make the mounting areas smaller.

In the seventh configuration described above, preferably, the first flexible substrate and the first substrate are connected with each other by a first connection member, the second flexible substrate and the second counter substrate are connected with each other by a second connection member, and the following expression is satisfied:

$$t\_A2 \geq t\_B2 + t\_FPC \times 2 + t\_ACF \times 2$$

where "t_A2" represents a thickness of the first counter substrate, "t_B2" represents a thickness of the second counter substrate, "t_FPC" represents each thickness of the first flexible substrate and the second flexible substrate, and "t_ACF" represents each thickness of the first connection member and the second connection member (the eighth configuration).

The above-described configuration causes the surface of the first display unit and the surface of the second display unit to be flush.

Any one of the first to third configurations described above may be such that the display device further includes a common substrate that is arranged on a viewer side with respect to the first substrate and the second substrate, so as to be opposed to the first substrate and the second substrate (the ninth configuration).

In the ninth configuration, preferably, the display device further includes a common flexible substrate on which the first line group and the second line group are formed, the common flexible substrate being connected to the common substrate (the tenth configuration).

With the above-described configuration, areas for connection of the first line group and the second line group can be reduced in size.

In any one of the first to tenth configurations described above, the display device may have a circular or oval outer shape in plan view (the eleventh configuration).

Any one of the first to eleventh configurations described above may be such that the display device further includes a control circuit that supplies a signal to the first line group and the second line group, wherein the control circuit is configured to cause a continuous image to be displayed on the first display unit and the second display unit (the twelfth configuration).

An apparatus according to one embodiment of the present invention includes a display device according to any one of the first to twelfth configurations.

EMBODIMENT

The following describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

[Overall Configuration]

Figure 2:
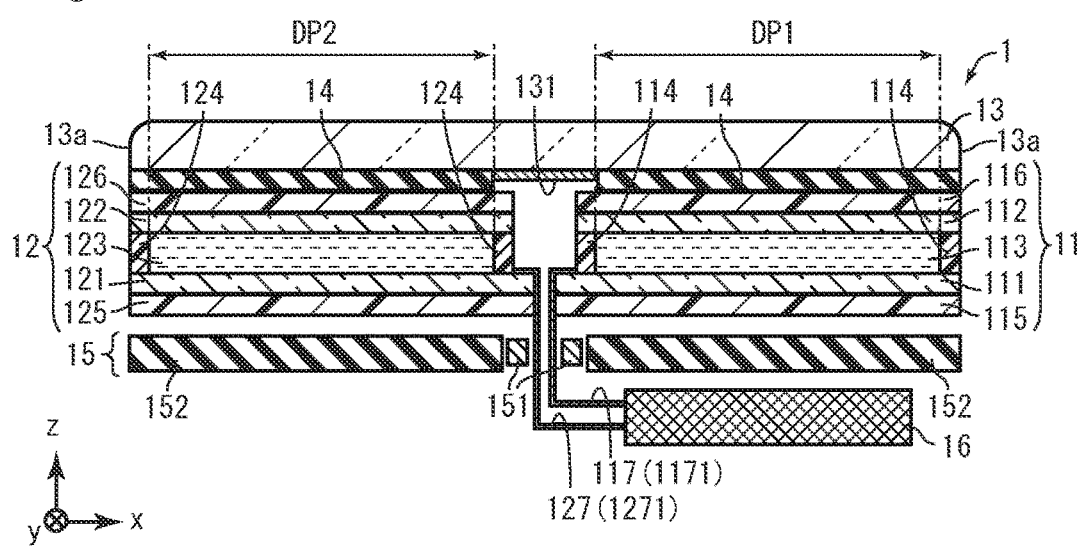
FIG. 2 is a cross-sectional view of the display device taken along line II-II in FIG. 1.

FIG. 1 is a plan view of a display device 1 according to Embodiment 1 of the present invention, viewed from a viewer side. FIG. 2 is a cross-sectional view of the display device taken along line II-II in FIG. 1. The display device 1 includes a first display unit 11, a second display unit 12, a front panel 13, a backlight 15 (FIG. 2), and a control circuit 16 (FIG. 2).

Each of the first display unit 11 and the second display unit 12 has an approximately semicircular shape, when viewed in a plan view. The first display unit 11 and the second display unit 12 are arranged so as to be adjacent to each other in the in-plane direction, so that parts thereof that correspond to the chords of the semicircles as their shapes face each other. This allows the display device 1 to have a circular outer shape as a whole when viewed in a plan view.

The first display unit 11 has a display area DP1 in a semicircular shape that is approximately analogous to the first display unit 11. The second display unit 12 similarly has a display area DP2 in a semicircular shape that is approximately analogous to the second display unit 12. The first display unit 11 displays an image in the first display area DP1, and the second display unit 12 displays an image in the second display area DP2.

An outer part around the first display area DP1, and an outer part around the second display area DP2 are non-display areas in which no image is displayed. The display device 1, as illustrated in FIG. 1, has a non-display area in an outer circumference part around the display device 1, and at the same time, has a non-display area at the center of the display device 1. The non-display area at the center of the display device 1 has a width t1 of, for example, 8 mm.

With respect to the first display unit 11, at a position that overlaps the non-display area at the center of the display device 1 when viewed in a plan view, a flexible substrate (first flexible substrate) 117 is connected. The first display unit 11 is electrically connected with a control circuit 16 (FIG. 2) via a first line group 1171 formed on the flexible substrate 117. Similarly with respect to the second display unit 12, at a position that overlaps the non-display area at the center of the display device 1 when viewed in a plan view, a flexible substrate (second flexible substrate) 127 is connected. The second display unit 12 is electrically connected with the control circuit 16 (FIG. 2) via a second line group 1271 formed on the flexible substrate 127.

The front panel 13 is arranged on a viewer side with respect to the first display unit 11 and the second display unit 12, so as to cover the first display unit 11 and the second display unit 12. The front panel 13 and the first display unit 11 are bonded with a translucent bonding member 14 (FIG. 2), and so are the front panel 13 and the second display unit 12. The bonding member 14 is formed with, for example, a translucent resin, or a translucent double-sided tape.

The front panel 13 is made of a translucent material such as tempered glass, and is configured so that a viewer can view the first display area DP1 and the second display area DP2. The front panel 13 makes the depths of the two display units uniform, thereby improving the appearance of the display device 1.

In a part of the front panel 13, a non-translucent colored section 131 is formed. More specifically, the colored section 131 is formed in the non-display area at the center of the display device 1, in other words, between the first display area DP1 and the second display area DP2. The colored section 131 can make the areas where the flexible substrates 117, 127 and the like are mounted invisible from a viewer. The colored section 131 further has an effect of decorating the display device 1.

The colored section 131 may be formed with a resin that contains a pigment or a dye, or may be formed with a sticker, etc. The colored section 131 may be colored in, for example, black, white, or another color, or may be mirror finished. Further, a light source and a light guide plate, or alternatively, a sheet-type light source using organic EL (electroluminescence) lighting and the like, may be provided, so that the colored section 131 is illuminated.

The end face 13a (FIG. 2) on the outer circumference of the front panel 13 is preferably a curved surface, or alternatively, in a prism state. This allows the non-display area on the outer circumference of the display device 1 to be made less visible due to the light refraction effect.

The backlight 15 (FIG. 2) is arranged on the back surface of the first display unit 11 and the second display unit 12, so as to project light to the first display unit 11 and the second display unit 12. The backlight 15 includes a light source 151 and a light guide plate 152. The light source 151 is, for example, a light emitting diode (LED). The light guide plate 152 is, for example, a resin-molded article, and converts light from the light source 151 into planar light, thereby projecting the same to the first display unit 11 and the second display unit 12. For the purpose of improving the luminance and reducing irregularities, an optical sheet such as a prism sheet or a diffusion sheet may be laminated on the light guide plate.

The control circuit 16 (FIG. 2) is arranged on the back surface of the first display unit 11 and the second display unit 12. The control circuit 16 supplies a signal through the first line group 1171 to the first display unit 11, and supplies a signal through the second line group 1271 to the second display unit 12. The control circuit 16 is configured so as to cause a continuous image to be displayed on the first display unit 11 and the second display unit 12.

Hereinafter, the configuration of the first display unit 11 and the second display unit 12 is described in detail. As illustrated in FIG. 2, the first display unit 11 includes an array substrate (first substrate) 111, a color filter substrate (first counter substrate) 112, a liquid crystal layer 113, a sealing member 114, and polarizing plates 115, 116. The second display unit 12 includes an array substrate (second substrate) 121, a color filter substrate (second counter substrate) 122, a liquid crystal layer 123, a sealing member 124, and polarizing plates 125, 126.

The array substrate 111 and the array substrate 121 are arranged so as to be adjacent to each other in the in-plane direction. The first line group 1171 is connected to the first display unit 11, passing through between the array substrate 111 and the array substrate 121. The second line group 1271 is connected to the second display unit 12, passing through between the array substrate 111 and the array substrate 121.

[Configuration of Display Units]

Both of the first display unit 11 and the second display unit 12 in the present embodiment are liquid crystal display devices, and have configurations that are approximately identical to each other. In the following description, therefore, only the first display unit 11 is described in detail, and the description of the second display unit 12 is appropriately omitted.

The array substrate 111 and the color filter substrate 112 are arranged so as to face each other. The sealing member 114 is formed along peripheral parts of the array substrate 111 and the color filter substrate 112. In a space defined by the array substrate 111, the color filter substrate 112, and the sealing member 114, liquid crystal molecules are filled, whereby the liquid crystal layer 113 is formed. The polarizing plate 115 is arranged on an outer-side surface of the array substrate 111 (on a surface thereof on a side opposite to the liquid crystal layer 113 side), and the polarizing plate 116 is arranged on an outer-side surface of the color filter substrate 112 (on a surface thereof on a side opposite to the liquid crystal layer 113 side).

Figure 3:
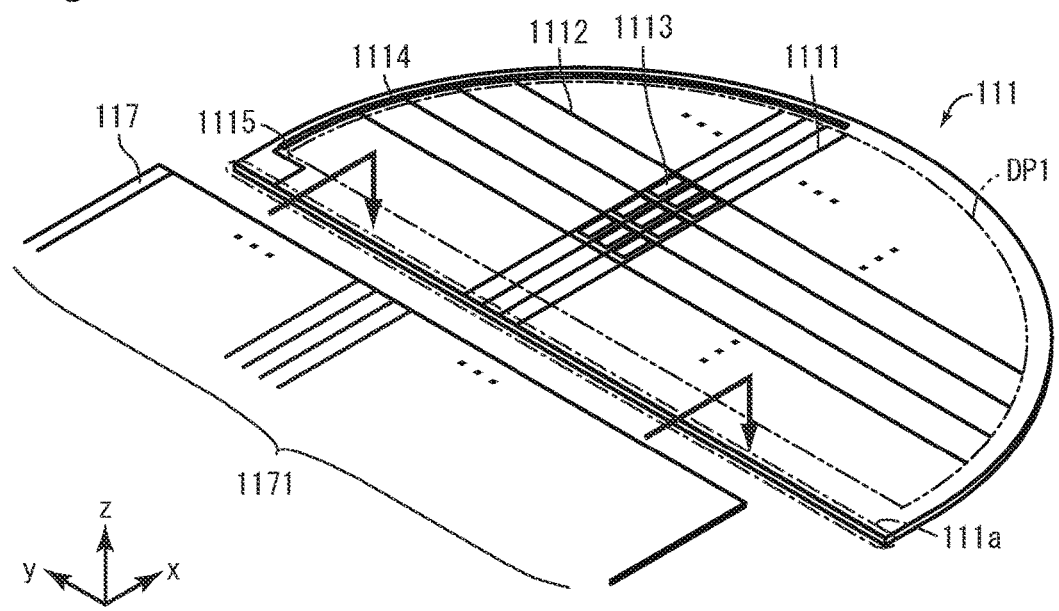
FIG. 3 schematically illustrates a configuration of an array substrate.
Figure 4:
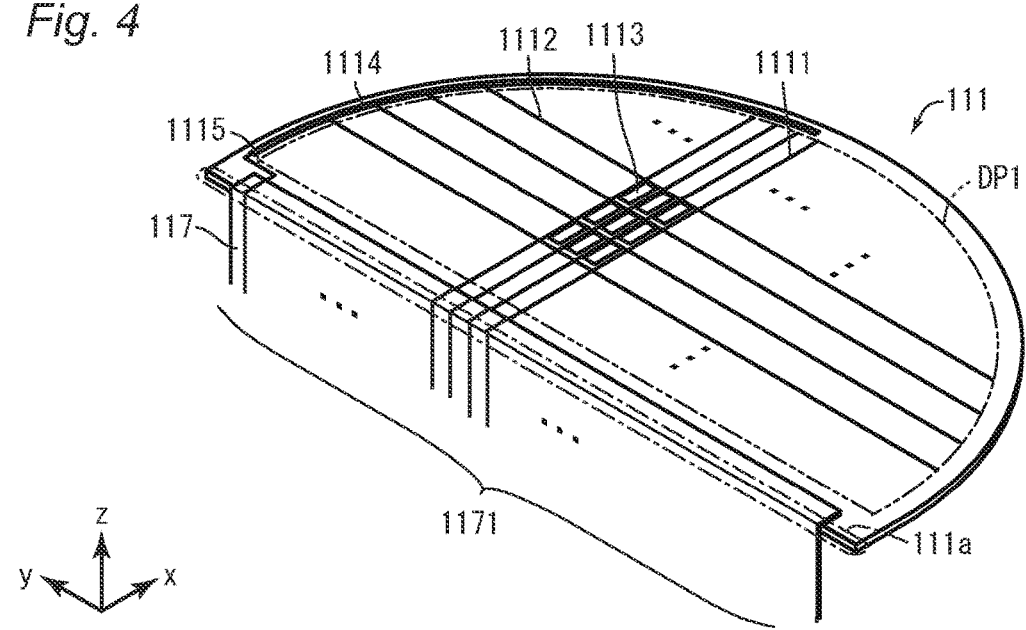
FIG. 4 schematically illustrates a state in which a flexible substrate is connected to the array substrate.

FIG. 3 schematically illustrates the configuration of the array substrate 111. FIG. 4 schematically illustrates a state in which the flexible substrate 117 is connected to the array substrate 111. On the array substrate 111, there are provided a plurality of source lines 1111, a plurality of gate lines 1112, thin film transistors (TFTs, not shown) formed at points of intersection of these lines, pixel electrodes 1113 connected to the drains of these TFTs, respectively, a gate line driving circuit 1114, a gate bus line 1115, a source line driving circuit (not shown), and the like. The source line driving circuit, however, may be formed on the flexible substrate 117.

The array substrate 111 is approximately in a semicircular shape when viewed in a plan view. The array substrate 111 includes a straight-line portion 111a along the outline thereof. More specifically, a portion of the array substrate 111 that corresponds to the chord of the semicircle as its shape is the straight-line portion 111a.

The flexible substrate 117 is connected to vicinities of the straight-line portion 111a of the array substrate 111. The flexible substrate 117 and the array substrate 111 are connected in such a manner that the first line group 1171 formed on the flexible substrate 117 are connected so as to be conductive with the source lines 1111 and the gate bus line 1115. The flexible substrate 117 and the array substrate 111 are connected by, for example, an anisotropic conductive film (for example, ANISOLM (registered trademark) available from Hitachi Chemical Co., Ltd.).

As illustrated in FIG. 4, after being connected to the array substrate 111, the flexible substrate 117 is bent toward the back side along the straight-line portion 111a, and is connected to the control circuit 16 (FIG. 2). The flexible substrate 117 is arranged so as to be along the end face that includes the straight-line portion 111a of the array substrate 111.

To the gate line driving circuit 1114, the gate line driving signal is supplied from the control circuit 16 (FIG. 2) through the first line group 1171 and the gate bus line 1115. The gate line driving circuit 1114 raises the potentials of the gate lines 1112 to the high level sequentially according to the gate line driving signal. To the source lines 1111, a source signal is supplied from the control circuit 16 (FIG. 2) through the first line group 1171 and the source line driving circuit. This allows a predetermined potential to be written in the pixel electrodes 1113. The first display unit 11 controls the potentials of the pixel electrodes 1113, respectively, so as to control the alignment of the liquid crystal molecules in the liquid crystal layer 113 (FIG. 2), whereby an arbitrary image is displayed on the first display area DP1.

To the second display unit 12 as well, a gate line driving signal and a source signal are supplied from the control circuit 16 through the second line group 1271 formed on the flexible substrate 127. The second display unit 12, as is the case with the first display unit 11, controls alignment of the liquid crystal molecules in the liquid crystal layer 123 according to these signals, whereby an arbitrary image is displayed on the second display area DP2.

[Effect of Display Device 1]

Thus, the configuration of the display device 1 according to Embodiment 1 of the present invention is described above. The display device 1 includes the first display unit 11 including the array substrate 111, and the second display unit 12 including the array substrate 121 arranged so as to be adjacent to the array substrate 111 in the in-plane direction of the array substrate 111. The first line group 1171 for supplying a signal to the first display unit 11, and the second line group 1271 for supplying a signal to the second display unit 12 are arranged so as to pass through between the array substrate 111 and the array substrate 121.

With this configuration, the first line group 1171 and the second line group 1271 are connected from the inner side of the display device 1. This makes it unnecessary to provide, in an outer circumference of the display device 1, areas for the connection of the first line group 1171 and the second line group 1271. This allows the display device 1 to have a narrower frame. Further, this allows the display device 1 to have the outer circumference in an arbitrary shape, and hence, for example, the outer shape may be a circular shape.

More specifically, the display device 1 further includes the flexible substrate 117 on which the first line group 1171 is formed, and the flexible substrate 127 on which the second line group 1271 is formed. The array substrate 111 includes the straight-line portion 111a along the outline thereof, and the flexible substrate 117 is arranged along the straight-line portion 111a of the array substrate 111. The array substrate 121 includes the straight-line portion 121a along the outline thereof, and the flexible substrate 127 is arranged along the straight-line portion 121a of the array substrate 121. The flexible substrate 117 is connected to the array substrate 111, and the flexible substrate 127 is connected to the array substrate 121.

The display device 1 further includes the translucent front panel 13, on a viewer side with respect to the first display unit 11 and the second display unit 12, the front panel 13 being arranged so as to cover the first display unit 11 and the second display unit 12. With this configuration, the depths of the two display units are made uniform, which improves the appearance of the display device 1.

The display device 1 further includes the colored section 131, which is formed on the front panel 13, at such a position that the colored section 131 overlaps an area between the display area of the first display unit 11 and the display area of the second display unit 12, when viewed in a plan view. With this configuration, the mounting area can be made visible to a viewer.

Figure 5:
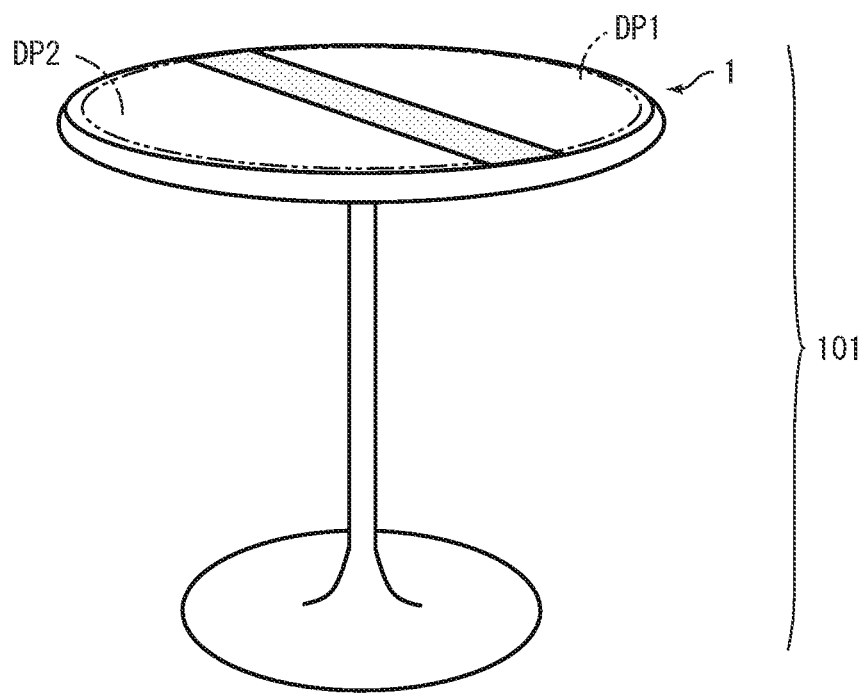
FIG. 5 illustrates an exemplary apparatus that includes the display device according to the embodiment of the present invention.
Figure 6:
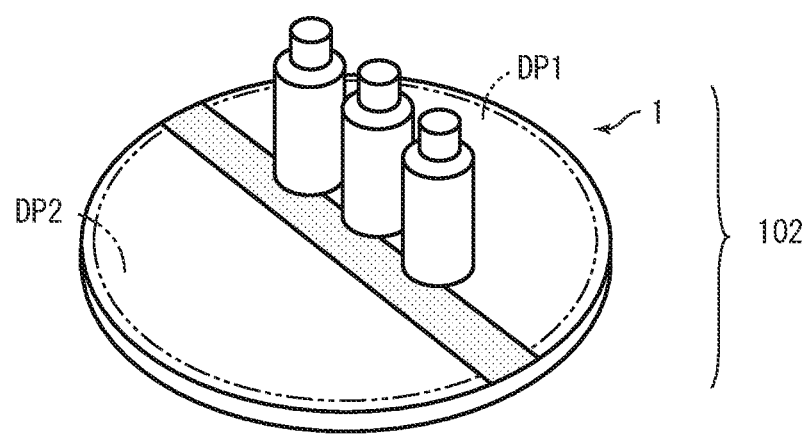
FIG. 6 illustrates another exemplary apparatus that includes the display device according to the embodiment of the present invention.

FIGS. 5 and 6 illustrate exemplary apparatuses that include the display device 1. FIG. 5 illustrates a table 101 in which the display device 1 is used. FIG. 6 illustrates an example in which the display device 1 is used in a merchandise display 102 in a retail store or the like. With use of the display device 1, the outer shape can be determined arbitrarily, though there is a non-display area within the screen. Further, since the peripheral frame can be made very narrow, an apparatus with an excellent design can be provided.

Embodiment 2

Figure 7:
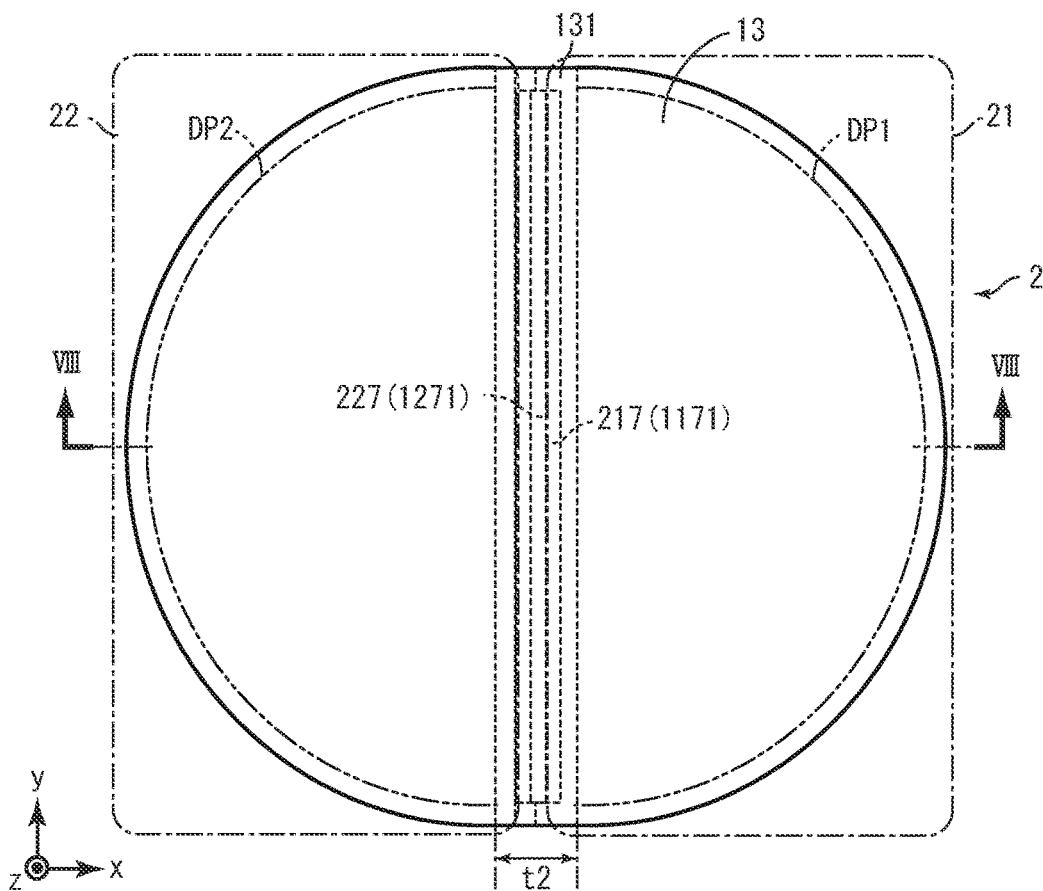
FIG. 7 is a plan view of a display device according to Embodiment 2 of the present invention, viewed from a viewer side.
Figure 8:
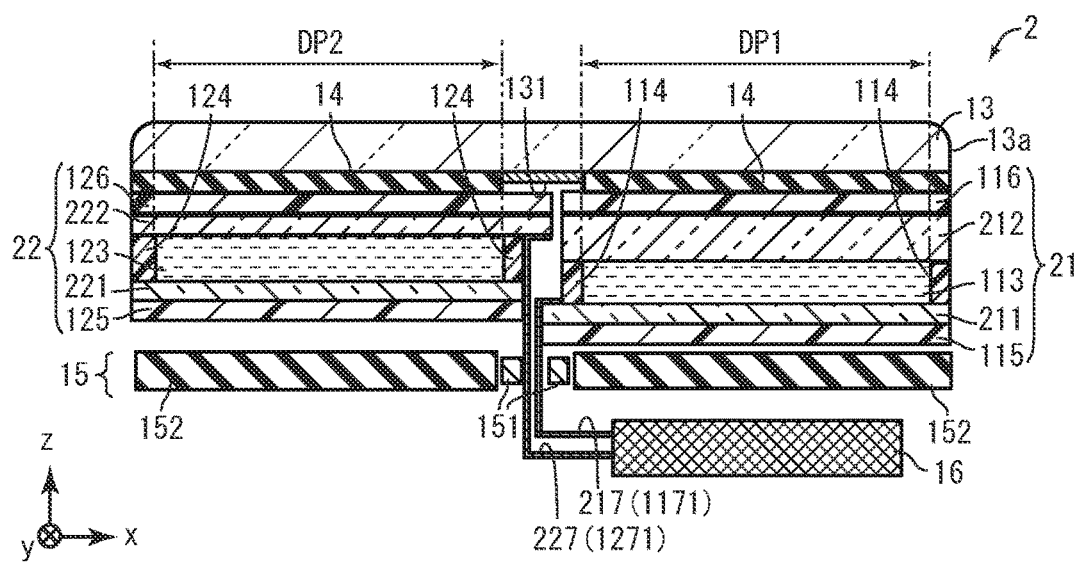
FIG. 8 is a cross-sectional view of the display device taken along line VIII-VIII in FIG. 7.

FIG. 7 is a plan view illustrating a display device 2 according to Embodiment 2 of the present invention, viewed from a viewer side. FIG. 8 is a cross-sectional view of the display device taken along line VIII-VIII in FIG. 7. The display device 2 includes a first display unit 21 and a second display unit 22, in place of the first display unit 11 and the second display unit 12 of the display device 1.

In the present embodiment as well, the first display unit 21 displays an image in the first display area DP1, and the second display unit 22 displays an image in the second display area DP2. As illustrated in FIG. 7, the display device 2 also includes a non-display area in an outer circumference part around the display device 2, and the display device 2 includes a non-display area at the center thereof. The non-display area at the center of the display device 2 has a width t2 of, for example, 6 mm.

To the first display unit 21, a flexible substrate (first flexible substrate) 217 on which the first line group 1171 is formed is connected. To the second display unit 22, a flexible substrate (second flexible substrate) 227 on which the second line group 1271 is formed is connected.

As illustrated in FIG. 8, the first display unit 21 includes an array substrate (first substrate) 211, a color filter substrate (first counter substrate) 212, a liquid crystal layer 113, a sealing member 114, and polarizing plates 115, 116. The second display unit 22 includes a color filter substrate (second substrate) 221, an array substrate (second counter substrate) 222, a liquid crystal layer 123, a sealing member 124, and polarizing plates 125, 126.

As illustrated in FIG. 8, the color filter substrate 212 of the first display unit 21 is arranged on a viewer side with respect to the array substrate 211, and the color filter substrate 221 of the second display unit 22 is arranged on a back side with respect to the array substrate 222. In the present embodiment, therefore, the array substrate 211 and the color filter substrate 221 are arranged so as to be adjacent with each other in the in-plane direction. The first line group 1171 is connected to the first display unit 21, passing through between the array substrate 211 and the color filter substrate 221, and the second line group 1271 is connected to the second display unit 22, passing through between the array substrate 211 and the color filter substrate 221.

In the present embodiment, the flexible substrate 217 is connected to the array substrate (first substrate) 211, and the flexible substrate 227 is connected to the array substrate (second counter substrate) 222.

With this configuration, the region for the connection between the flexible substrate 217 and the array substrate 211, and the region for the connection between the flexible substrate 227 and the array substrate 222 can be arranged so as to partially overlap in plan view. This allows the connection region in plan view to be reduced in size. In other words, the width t2 of the non-display area can be decreased.

Here, preferably, the surface of the first display unit 21 and the surface of the second display unit 22 are flush, so that the depth of the display surface is uniform. More specifically, the surface of the polarizing plate 116 and the polarizing plate 126 are preferably flush. The step between the polarizing plate 116 and the polarizing plate 126 is preferably within 0.2 mm.

Figure 9:
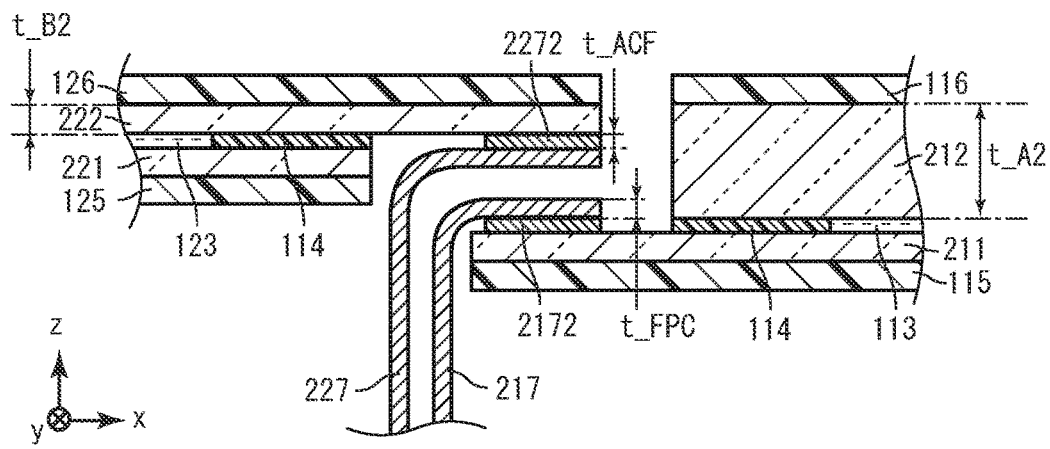
FIG. 9 is a cross-sectional view that illustrates an expanded view of the vicinities of the flexible substrate.

FIG. 9 is a cross-sectional view that illustrates an expanded view of vicinities of the flexible substrate 217 and the flexible substrate 227. In the present embodiment, the flexible substrate 217 and the array substrate 211 are connected to each other with a first connection member 2172. The flexible substrate 227 and the array substrate 222 are connected to each other by a second connection member 2272. The first connection member 2172 and the second connection member 2272 are, for example, anisotropy conductive films.

To make the surface of the first display unit 21 and the surface of the second display unit 22 flush, the thickness t_A2 of the color filter substrate 212 may be set greater than the thickness t_B2 of the array substrate 222. More specifically, the thickness t_A2 of the color filter substrate (first counter substrate) 212 may be set greater than the thickness t_B2 of the array substrate (second counter substrate) 222, for the thickness of the flexible substrate 217 and the thickness of the flexible substrate 227 plus the thickness of the first connection member 2171 and the thickness of the second connection member 2272.

In other words, when each thickness of the flexible substrates 217 and 227 is given as t_FPC, and each thickness of the first connection member 2172 and the second connection member 2272 is given as t_ACF, then the following expression may be satisfied:

$$t\_A2 \geq t\_B2 + t\_FPC \times 2 + t\_ACF \times 2$$

For example, when t_FPC is assumed to be 0.1 mm, t_ACF, 0.02 mm, and t_B2, 0.46 mm, then, t_A2 may be set to 0.7 mm or greater. It should be noted that the thicknesses of the liquid crystal layer 113 and the liquid crystal 123 are, for example, about 0.004 mm, which is at an ignorable level.

Thus, the configuration of the display device 2 is described in the foregoing description. With the configuration of the display device 2, the flexible substrate 217 and the flexible substrate 227 can be arranged so as to partially overlap each other when viewed in a plan view, whereby the mounting area can be decreased in size. This makes it possible to provide a configuration of the display device in which the non-display area has a smaller width as compared with the display device 1.

Embodiment 3

Figure 10:
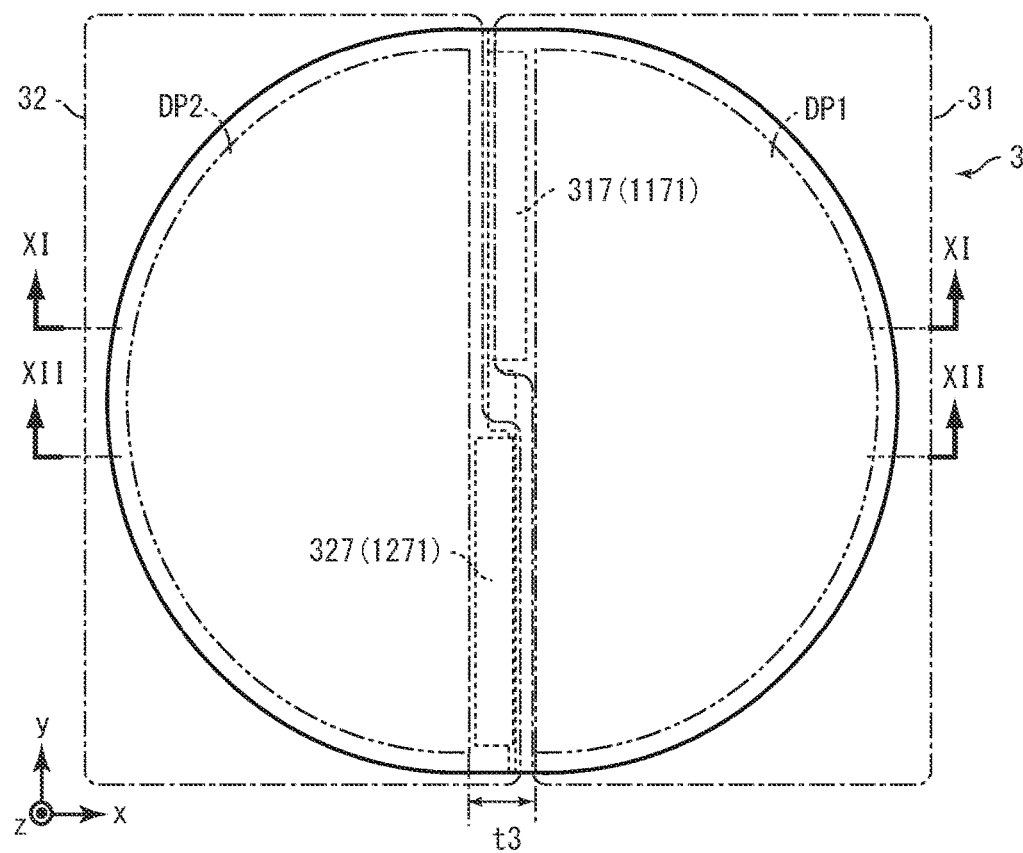
FIG. 10 is a plan view of a display device according to Embodiment 3 of the present invention, viewed from a viewer side.
Figure 11:
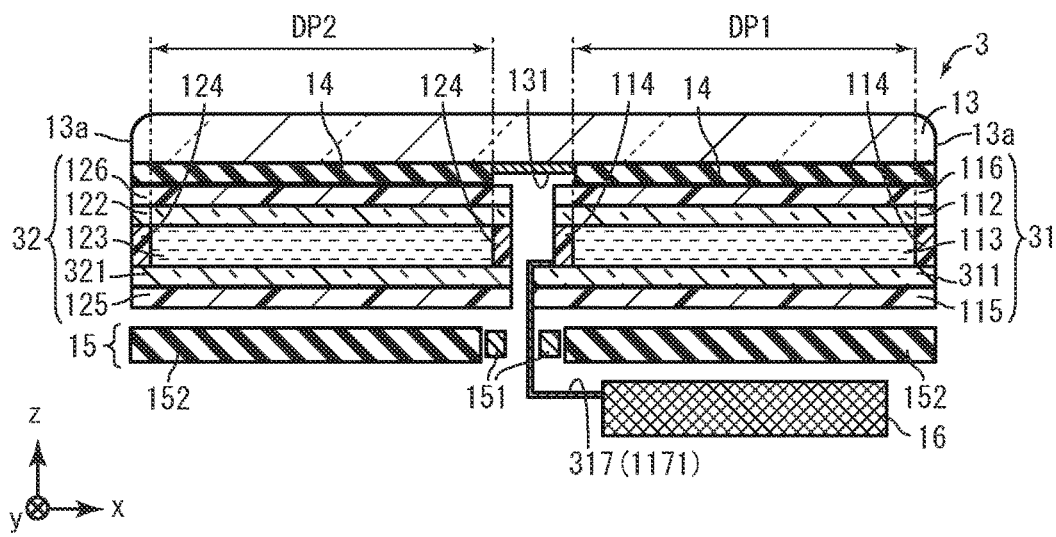
FIG. 11 is a cross-sectional view of the display device taken along line XI-XI in FIG. 10.
Figure 12:
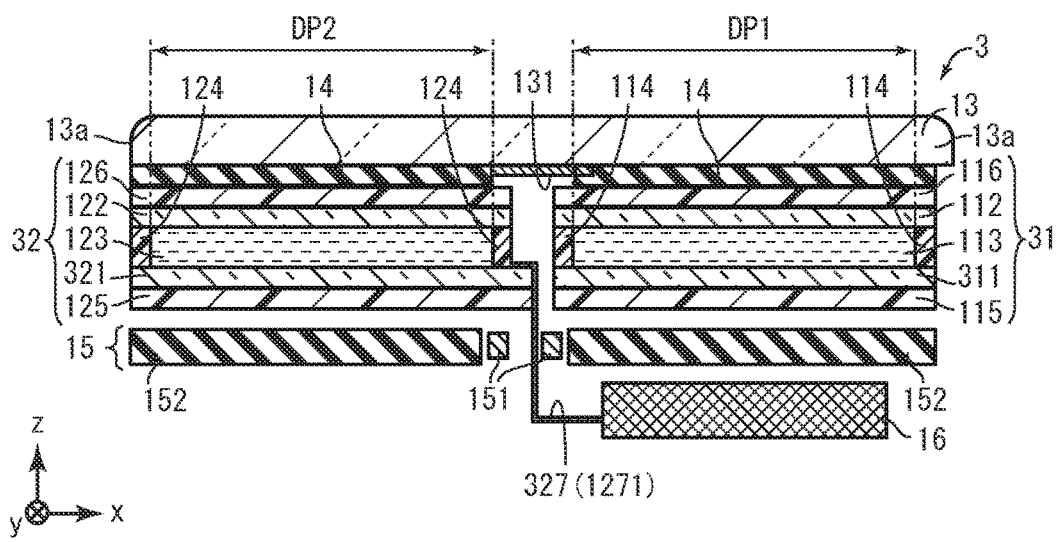
FIG. 12 is a cross-sectional view of the display device taken along line XII-XII in FIG. 10.

FIG. 10 is a plan view of a display device 3 according to Embodiment 3 of the present invention, viewed from a viewer side. FIG. 11 is a cross-sectional view of the display device taken along line XI-XI in FIG. 10. FIG. 12 is a cross-sectional view of the display device taken along line XII-XII in FIG. 10. The display device 3 includes a first display unit 31 and a second display unit 32, in place of the first display unit 11 and the second display unit 12 of the display device 1.

In the present embodiment as well, the first display unit 31 displays an image in the first display area DP1, and the second display unit 32 displays an image in the second display area DP2. As illustrated in FIG. 10, the display device 3 has a non-display area in an outer circumference part around the display device 3, and at the same time, has a non-display area at the center of the display device 3. The non-display area at the center of the display device 3 has a width t3 of, for example, 6 mm.

To the first display unit 31, a flexible substrate (first flexible substrate) 317 on which a first line group 1171 is formed is connected. To the second display unit 32, a flexible substrate (second flexible substrate) 327 on which a second line group 1271 is formed is connected.

As illustrated in FIGS. 11 and 12, the first display unit 31 includes an array substrate 311, in place of the array substrate 111 of the first display unit 11. The second display unit 32 includes an array substrate 321, in place of the array substrate 121 of the second display unit 12.

Figure 13:
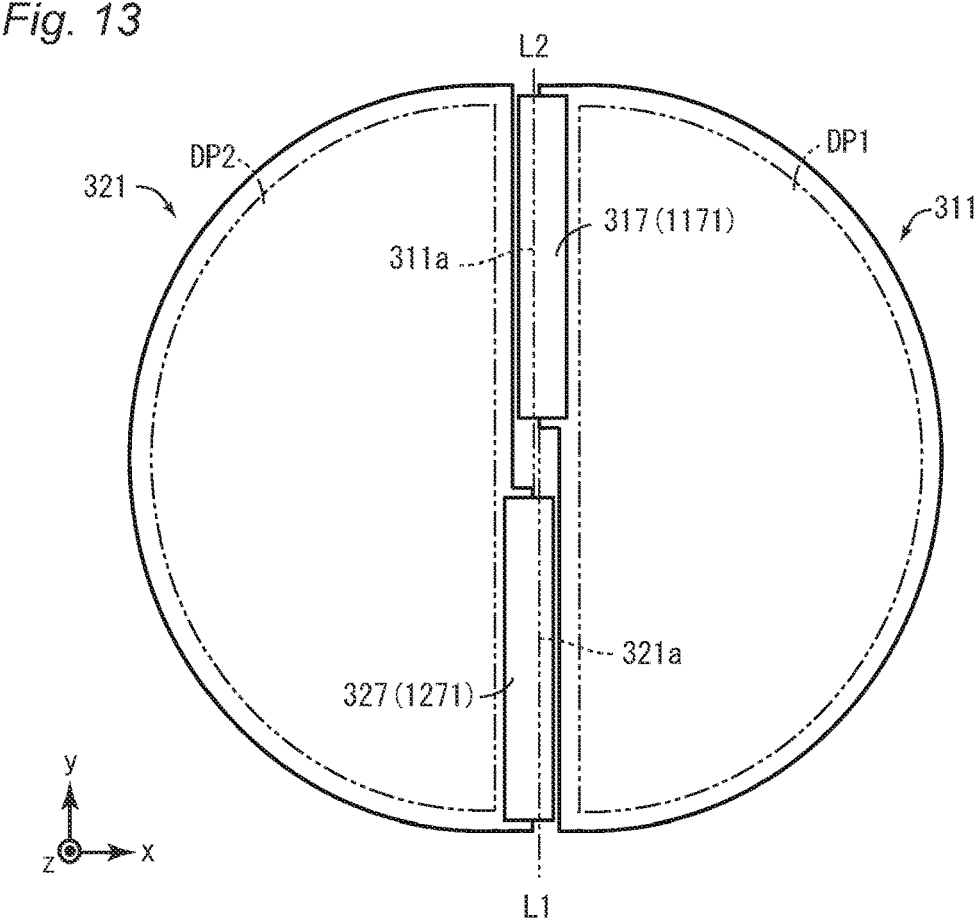
FIG. 13 is a plan view that illustrates array substrates and the like, extracted from the configuration of the display device according to the embodiment of the present invention.

FIG. 13 is a plan view that illustrates the array substrate 311, the array substrate 321, and the like, extracted from the configuration of the display device 3. The array substrate 311 and the array substrate 321 are different in shapes from the array substrate 111 and the array substrate 121, respectively.

The array substrate 311, as is the case with the array substrate 111 (FIG. 3), includes a straight-line portion 311a along the outline thereof. In the case of the array substrate 111 (FIG. 3), the entirety of the portion corresponding to the chord of the semicircle is the straight-line portion 111a; on the other hand, in the case of the array substrate 311 (FIG. 13), a part of the portion corresponding to the chord of the semicircle is the straight-line portion 311a. More specifically, in the array substrate 311 in the semicircular shape, one of portions obtained by dividing the portion corresponding to the chord of the semicircle into two approximately equally is the straight-line portion 311a.

Similarly, the array substrate 321 also includes a straight-line portion 321a along the outline thereof. More specifically, in the array substrate 321 in the semicircular shape, one of portions obtained by dividing the portion corresponding to the chord of the semicircle into two approximately equally is the straight-line portion 321a.

The flexible substrate 317 is connected to vicinities of the straight-line portion 311a of the array substrate 311. The flexible substrate 317 is arranged so as to be along the end face that includes the straight-line portion 311a of the array substrate 311. Further, the flexible substrate 317 is arranged so as to intersect with a virtual line L2 that is obtained by extending a straight line along the straight-line portion 321a of the array substrate 321.

The flexible substrate 327 is connected to vicinities of the straight-line portion 321a of the array substrate 321. The flexible substrate 327 is arranged so as to be along the end face that includes the straight-line portion 321a of the array substrate 321. Further, the flexible substrate 327 is arranged so as to intersect with a virtual line L1 that is obtained by extending a straight line along the straight-line portion 311a of the array substrate 311.

In other words, in the present embodiment, the flexible substrate 317 is arranged so as to be shifted toward one side in the y direction, and the flexible substrate 327 is arranged so as to be shifted toward the other side in the y direction. In other words, the flexible substrate 317 and the flexible substrate 327 are arranged alternately in the y direction.

Figure 14:
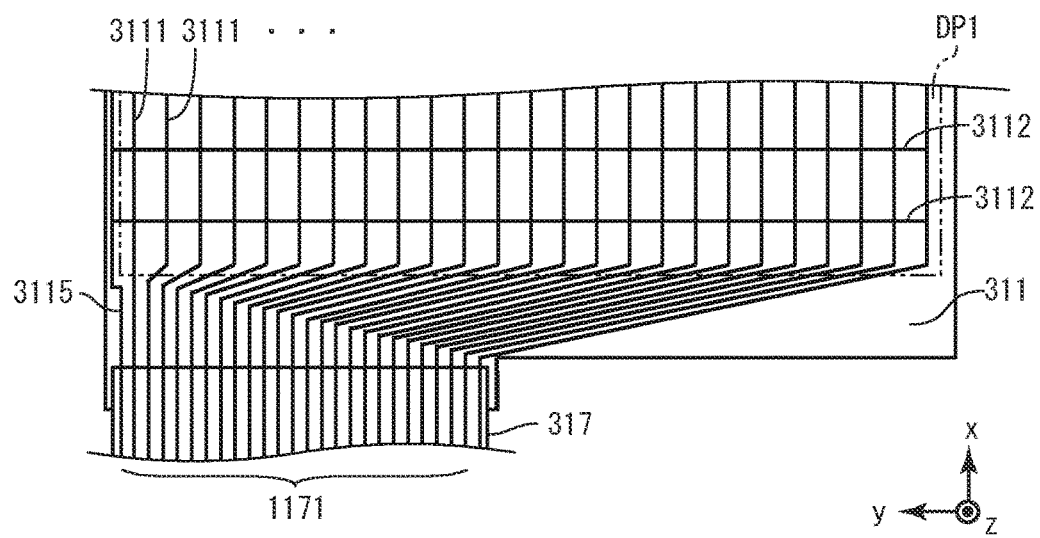
FIG. 14 is a plan view that illustrates an expanded view of the vicinities of an end of the array substrate.

FIG. 14 is a plan view that illustrates an expanded view of the vicinities of an end of the array substrate 311. On the array substrate 311, as is the case with the array substrate 111 (FIG. 3), a plurality of source lines 3111, a plurality of gate lines 3112, a gate bus line 3115, and the like are formed. Such an arrangement in which the flexible substrate 317 is shifted toward one side in the y direction can be achieved by shifting the source lines 3111 and the like toward one side when they are routed in a pattern end part, as illustrated in FIG. 14.

Thus, the configuration of the display device 3 is described in the foregoing description. According to the configuration of the display device 3, the flexible substrate 317 and the flexible substrate 327 are arranged alternately in the y direction. The arrangement, therefore, is such that, when viewed in the y direction, the flexible substrate 317 and the flexible substrate 327 partially overlap each other. As a result, a configuration of a display device can be obtained in which the non-display area is narrower in width, as compared with the display device 1.

Modification Example 1 of Embodiment 3

Figure 15:
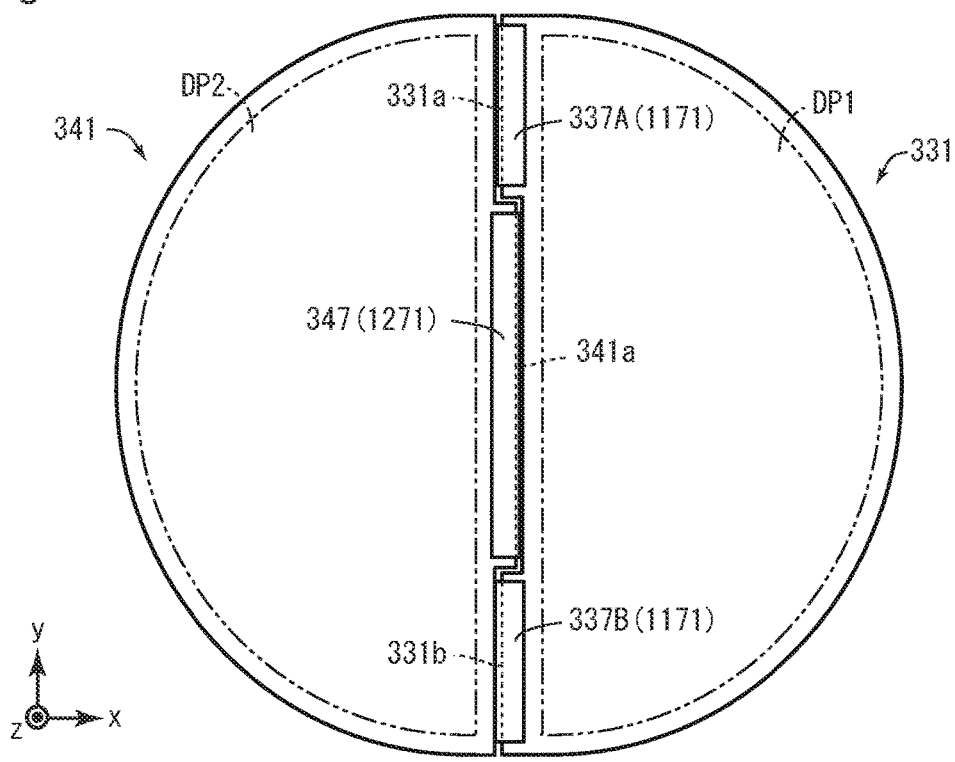
FIG. 15 is a plan view illustrating array substrates and the like, extracted from a configuration of a display device according to a modification example.

The display device 3 may include an array substrate 331 and an array substrate 341 described below, in place of the array substrate 311 and the array substrate 321. FIG. 15 is a plan view illustrating an array substrate 331, an array substrate 341, and the like, extracted from a configuration of a display device according to a modification example of the display device 3.

To the array substrate 331, a flexible substrate 337A and a flexible substrate 337B are connected. To the array substrate 341, a flexible substrate 347 is connected. In the present modification example, the first line group 1171 is divided so as to be formed on the flexible substrate 337A and the flexible substrate 337B. The second line group 1271 is formed on the flexible substrate 347.

The array substrate 331 includes a straight-line portion 331a and a straight-line portion 331b along the outline thereof. More specifically, vicinities of one end of a chord portion of the semicircular array substrate 331 constitute the straight-line portion 331a, and vicinities of the other end of the chord portion of the semicircular array substrate 331 constitute the straight-line portion 331b. The flexible substrate 337A is connected to the vicinities of the straight-line portion 331a, and the flexible substrate 337B is connected to the vicinities of the straight-line portion 331b.

The array substrate 341 includes a straight-line portion 341a along the outline thereof. More specifically, vicinities of the center of a chord portion of the semicircular array substrate 341 constitute the straight-line portion 341a. The flexible substrate 347 is connected to the vicinities of the straight-line portion 341a.

In the present modification example as well, the flexible substrate 337A, the flexible substrate 347, and the flexible substrate 337B are arranged alternately in the y direction. This makes it possible to arrange the flexible substrate 337A, the flexible substrate 347, and the flexible substrate 337B in such a manner that they partially overlap when viewed in the y direction. As a result, a configuration of a display device can be obtained in which the non-display area is narrower in width, as compared with the display device 1.

Figure 16:
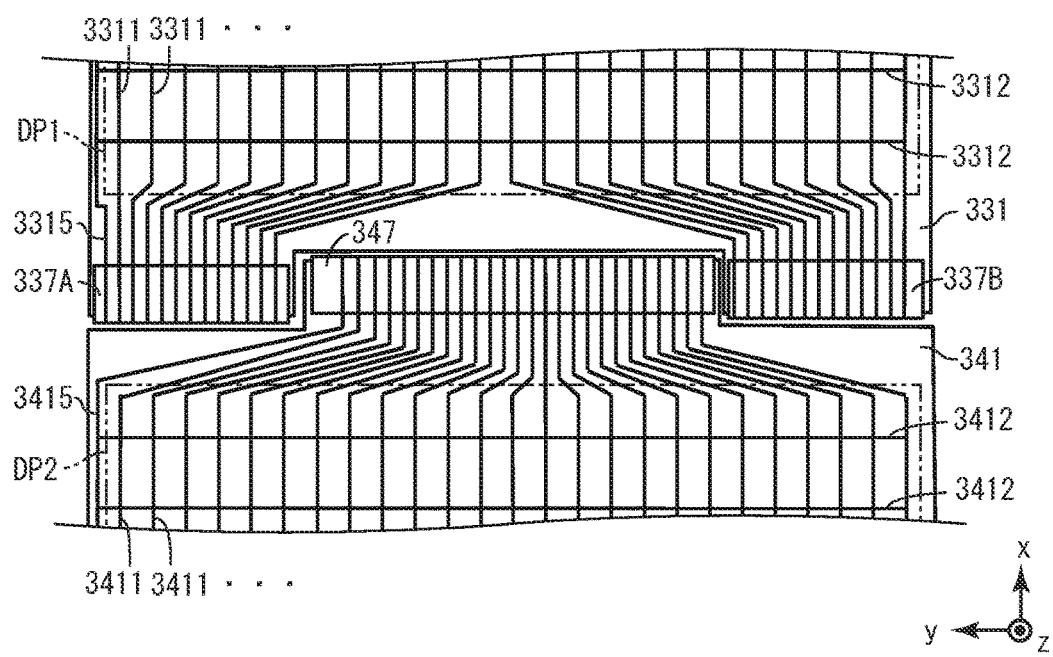
FIG. 16 is a plan view that illustrates an expanded view of vicinities of ends of the array substrates.

FIG. 16 is a plan view that illustrates an expanded view of vicinities of ends of the array substrate 331 and the array substrate 341. On the array substrate 331, as is the case with the array substrate 311, a plurality of source lines 3311, a plurality of gate lines 3312, a gate bus line 3115, and the like are formed. On the array substrate 341, similarly, a plurality of source lines 3411, a plurality of gate lines 3412, a gate bus line 3415, and the like are formed.

In the present modification example, as illustrated in FIG. 16, the source lines 3311 of the array substrate 331 are arranged so as to be shifted to both sides in the y direction, and the source lines 3411 of the array substrate 332 are arranged so as to be shifted to the center in the y direction. This arrangement makes it easier to ensure a space for routing the lines, as compared with the case illustrated in FIG. 14. In some cases, therefore, the non-display area can be made further narrower in width, as compared with the case of the display device 3.

Modification Example 2 of Embodiment 3

Figure 17:
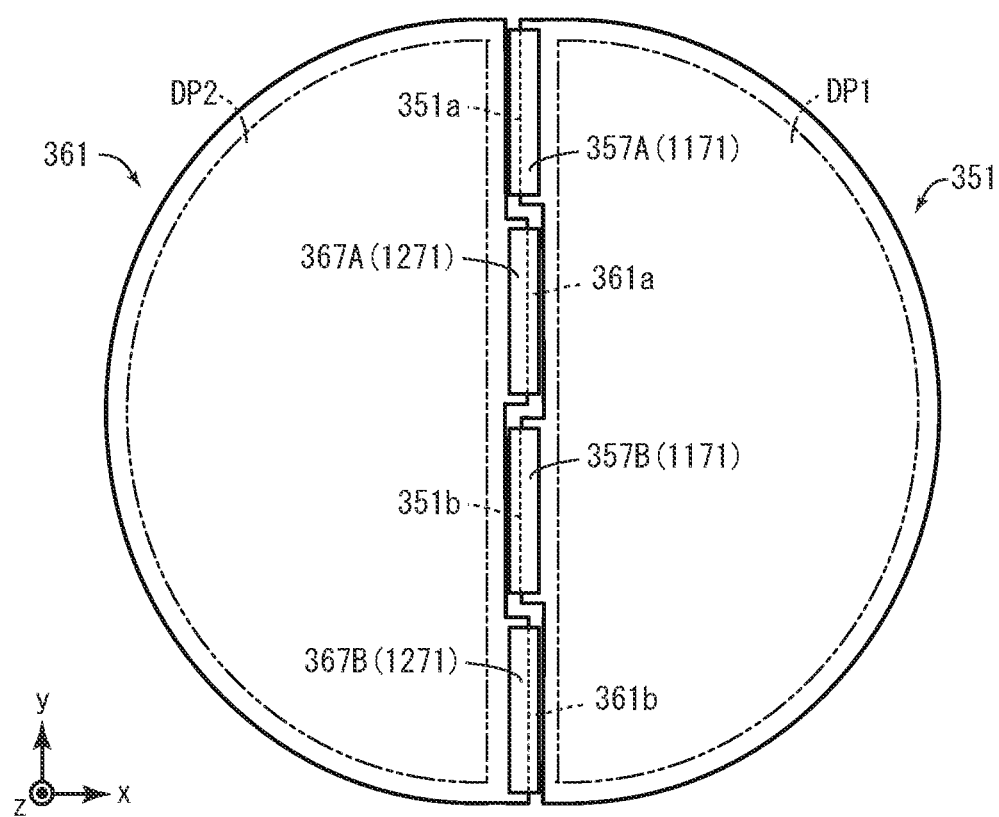
FIG. 17 is a plan view illustrating array substrates and the like, extracted from a configuration of a display device according to a modification example.

The display device 3 may include an array substrate 351 and an array substrate 361 described below, in place of the array substrate 311 and the array substrate 321. FIG. 17 is a plan view illustrating an array substrate 351, an array substrate 361, and the like, extracted from a configuration of a display device according to a modification example of the display device 3.

To the array substrate 351, a flexible substrate 357A and a flexible substrate 357B are connected. To the array substrate 361, a flexible substrate 367A and a flexible substrate 367B are connected. In the present modification example, the first line group 1171 is divided so as to be formed on the flexible substrate 357A and the flexible substrate 357B. The second line group 1271 is divided so as to be formed on the flexible substrate 367A and the flexible substrate 367B.

The array substrate 351 includes a straight-line portion 351a and a straight-line portion 351b along the outline thereof. More specifically, in the semicircular array substrate 351, vicinities of one end of the chord portion constitute the straight-line portion 351a, and a portion that is in the center part and is closer to the other end of the chord portion is the straight-line portion 351b. The flexible substrate 357A is connected to the vicinities of the straight-line portion 351a, and the flexible substrate 357B is connected to the vicinities of the straight-line portion 351b.

The array substrate 361 also includes a straight-line portion 361a and a straight-line portion 361b along the outline thereof. More specifically, in the semicircular array substrate 361, vicinities of one end of the chord portion constitute the straight-line portion 361a, and a portion that is in the center part and is closer to the other end of the chord portion is the straight-line portion 361b. The flexible substrate 367A is connected to the vicinities of the straight-line portion 361a, and the flexible substrate 367B is connected to the vicinities of the straight-line portion 361b.

With the present modification example as well, the effect identical to that of the modification example described with reference to FIG. 15 is achieved. Since the space for routing the lines can be ensured more easily as compared with the case of FIG. 15, the non-display area can be made further narrower in width in some cases. Additionally, with the present modification example, the array substrate 351 and the array substrate 361 can be formed in identical shapes. The total cost therefore can be reduced by the mass production effect.

Embodiment 4

Figure 18:
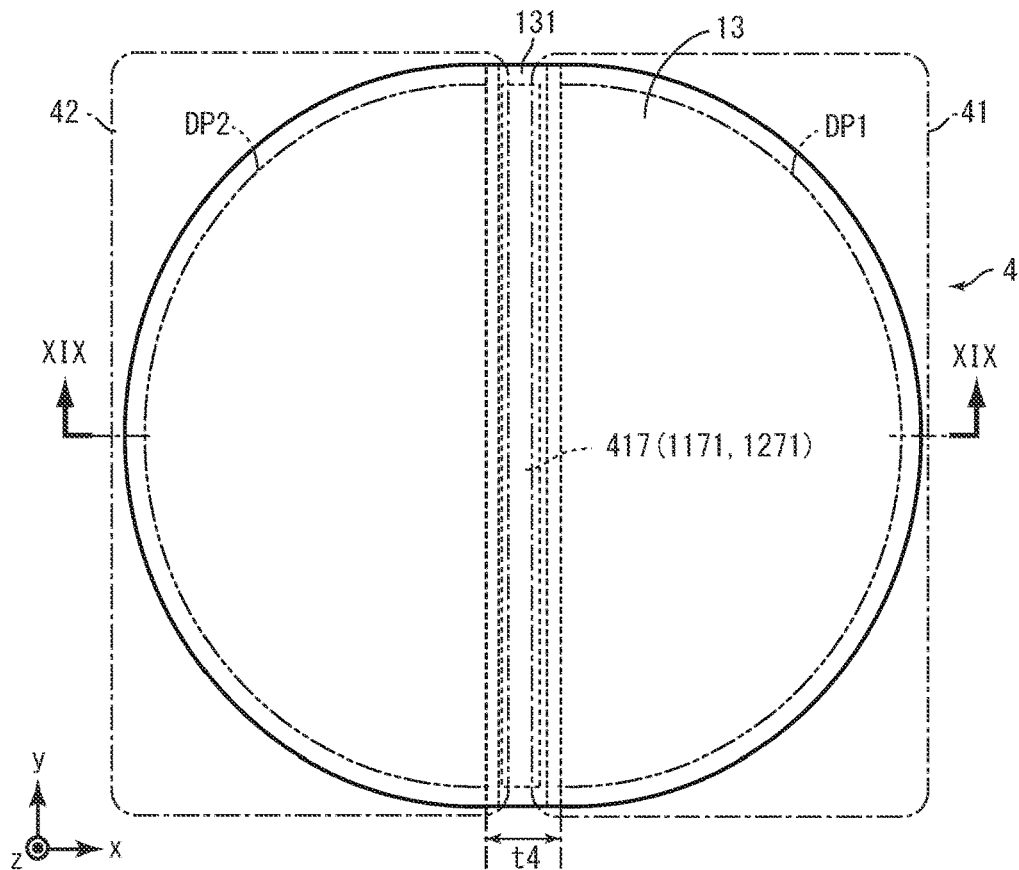
FIG. 18 is a plan view of a display device according to Embodiment 4 of the present invention, viewed from a viewer side.
Figure 19:
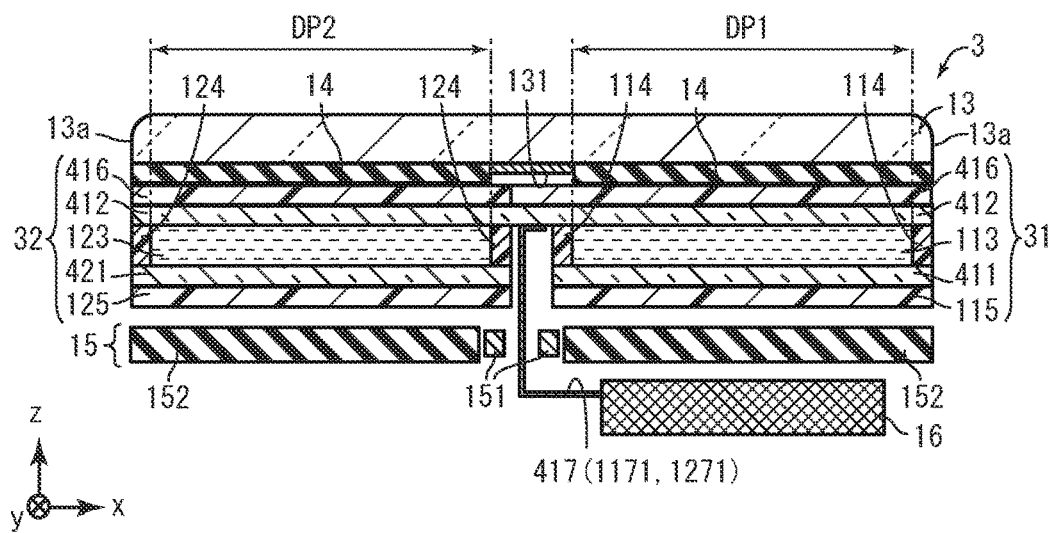
FIG. 19 is cross-sectional view of the display device taken along line XIX-XIX in FIG. 18.

FIG. 18 is a plan view of a display device 4 according to Embodiment 4 of the present invention, viewed from a viewer side. FIG. 19 is cross-sectional view of the display device taken along line XIX-XIX in FIG. 18. The display device 4 includes a first display unit 41 and a second display unit 42 in place of the first display unit 11 and the second display unit 12 of the display device 1.

In the present embodiment as well, the first display unit 41 displays an image in the first display area DP1, and the second display unit 42 displays an image in the second display area DP2. As illustrated in FIG. 18, the display device 4 also has a non-display area along the outer circumference of the display device 4, and also has a non-display area at the center of the display device 4. The non-display area at the center of the display device 4 has a width t4 of, for example, 4 mm.

In the present embodiment, the first display unit 41 and the second display unit 42 share one of the substrates and one of the polarizing plates. More specifically, as illustrated in FIG. 19, the first display unit 41 includes a color filter substrate (first substrate) 411, a common array substrate (common substrate) 412, a liquid crystal layer 113, a sealing member 114, a polarizing plate 115, and a common polarizing plate 416. The second display unit 42 includes a color filter substrate (second substrate) 421, the common array substrate (common substrate) 412, a liquid crystal layer 123, a sealing member 124, a polarizing plate 125, and the common polarizing plate 416.

In the present embodiment, the first line group 1171 and the second line group 1271 are formed on one flexible substrate (common flexible substrate) 417. The common flexible substrate 417 is connected to the common array substrate 412.

Figure 20:
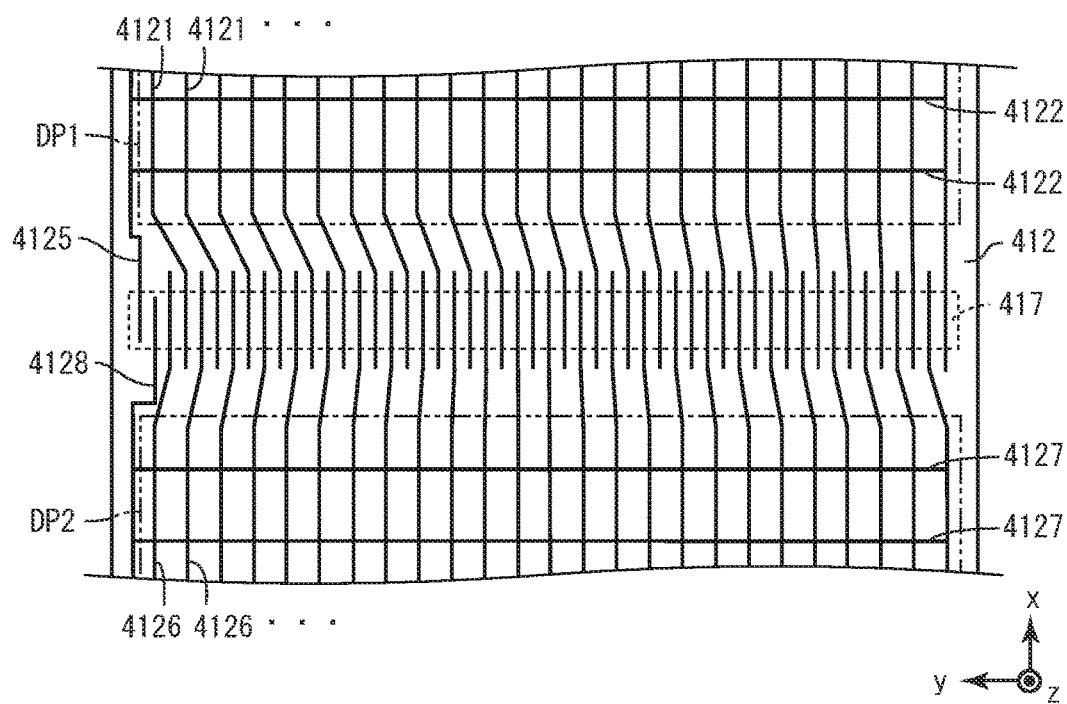
FIG. 20 illustrates an exemplary line pattern on a common array substrate.

FIG. 20 illustrates an exemplary line pattern on a common array substrate 412. On the common array substrate 412, in an area on the display area DP1 side, a plurality of source lines 4121, a plurality of gate lines 4122, a gate bus line 4125, and the like are formed. On the common array substrate 412, further, in an area on the display area DP2 side, a plurality of source lines 4126, a plurality of gate lines 4127, a gate bus line 4128, and the like are formed. In the example illustrated in FIG. 20, the source lines 4121 and the source lines 4126 are arranged alternately in the y direction.

Figure 21:
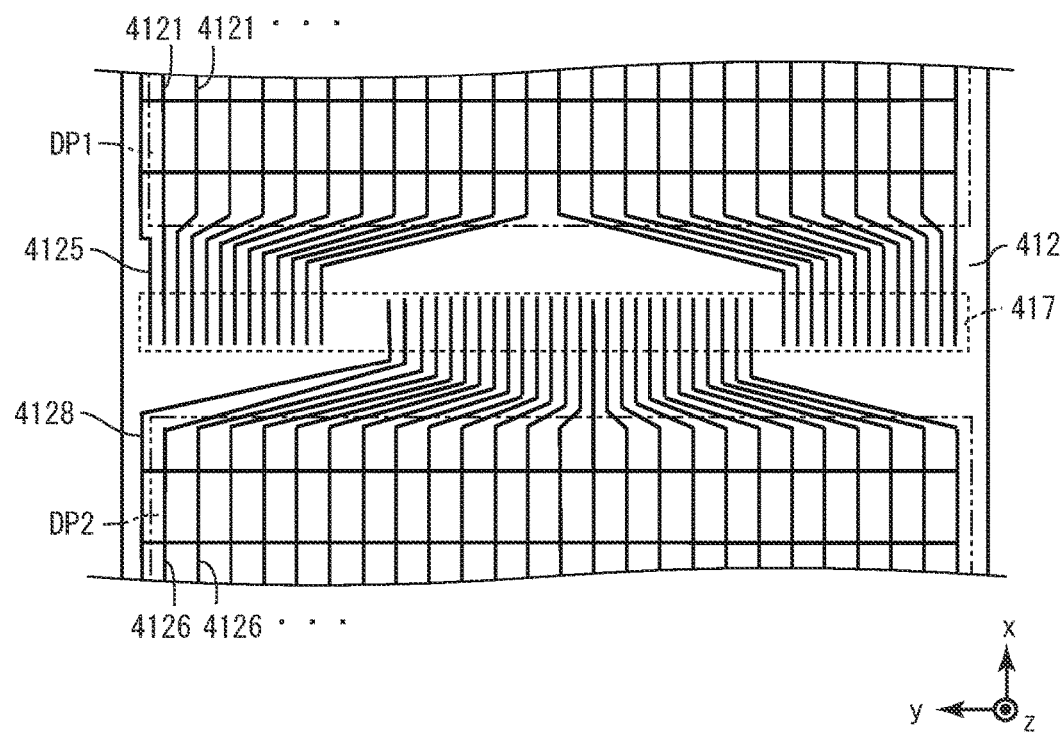
FIG. 21 illustrates another exemplary line pattern on the common array substrate.

FIG. 21 illustrates another exemplary line pattern on the common array substrate 412. In the example illustrated in FIG. 21, the source lines 4121 are arranged so as to be shifted to both sides in the y direction, and the source lines 4126 are arranged so as to be shifted to vicinities of the center in the y direction.

Thus, the configuration of the display device 4 is described in the foregoing description. With the configuration of the display device 4, areas for the connection of the first line group 1171 and the second line group 1271 can be reduced in size. This makes it possible to make the non-display area narrower in width, as compared with the case of the display device 1.

Other Embodiments

In the foregoing description, the embodiments of the present invention are described, but the present invention is not limited to the embodiments mentioned above. The present invention can be varied within the scope of the invention. Further, the embodiments can be appropriately combined.

The above-described embodiments are described with reference to examples in which the display device has a circular outer shape as a whole, when viewed in a plan view. The shape of the display device, however, is not limited to this.

Figure 22:
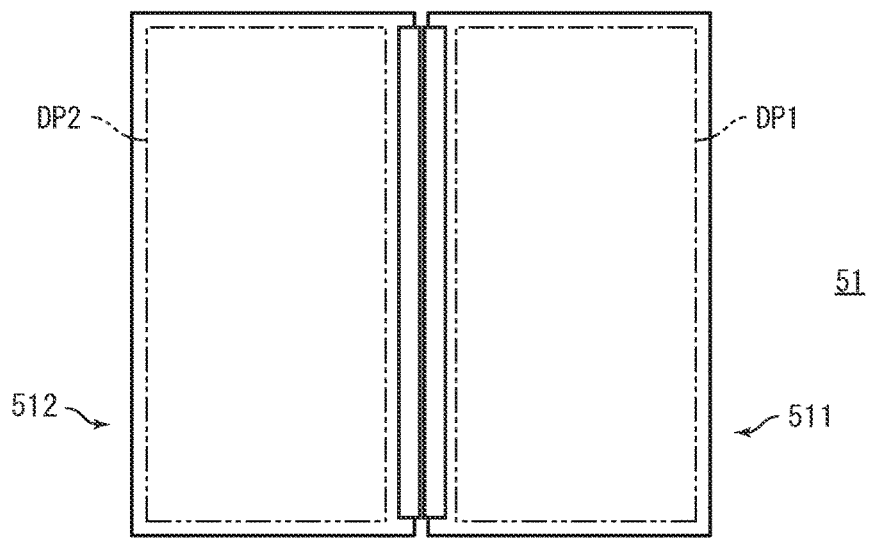
FIG. 22 is a plan view illustrating an exemplary display device having a rectangular outer shape.

FIG. 22 is a plan view illustrating a display device 51 as an exemplary display device having a rectangular outer shape. The display device 51 includes a first display unit 511 and a second display unit 512 each of which has a rectangular outer shape and that are arranged so as to be adjacent in the same plane. The first display unit 511 displays an image in a first display area DP1, and the second display unit 512 displays an image in a second display area DP2.

Figure 23:
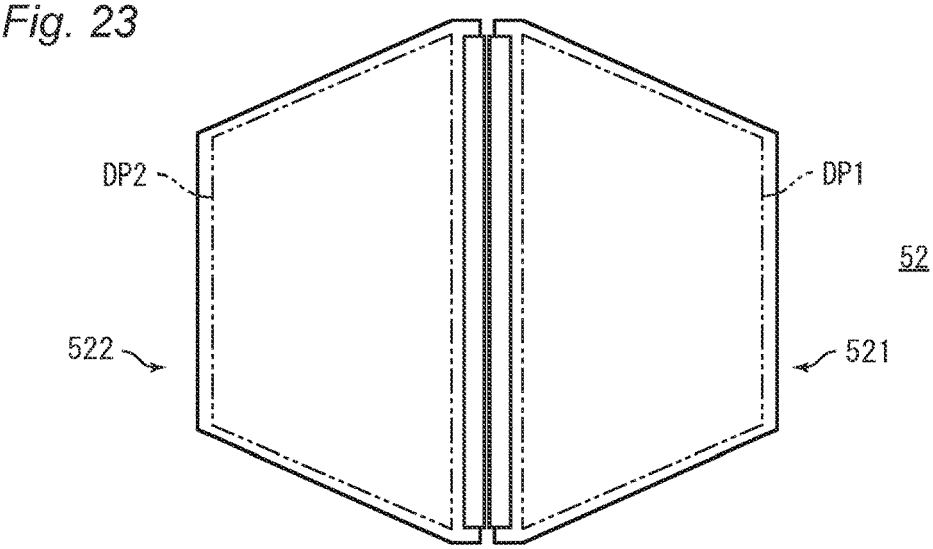
FIG. 23 is a plan view illustrating an exemplary display device having an approximately hexagonal outer shape.

FIG. 23 is a plan view illustrating a display device 52 as an exemplary display device having an approximately hexagonal outer shape. The display device 52 includes a first display unit 521 and a second display unit 522 each of which has a trapezoidal outer shape and that are arranged so as to be adjacent in the same plane. The first display unit 521 displays an image in a first display area DP1, and the second display unit 522 displays an image in a second display area DP2.

Figure 24:
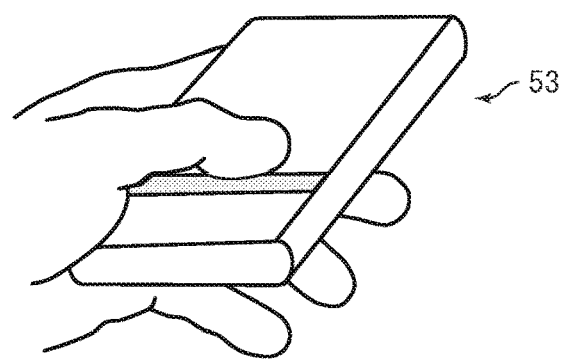
FIG. 24 illustrates an exemplary apparatus including a rectangular display device.

In the cases of the display devices illustrated in FIG. 22 and FIG. 23 as well, no mounting area is provided along the outer circumference of the display device. FIG. 24 schematically illustrates a state of use of a smartphone 53 as an exemplary apparatus including a rectangular display device. In the cases of the display devices illustrated in FIGS. 22 and 23 as well, the circumferential frame part can be made very narrow, and therefore, an apparatus with an excellent design can be provided.

In the above descriptions of the embodiments, a case where a display device includes two display units is described. A display device, however, may include three or more display units.

Figure 25:
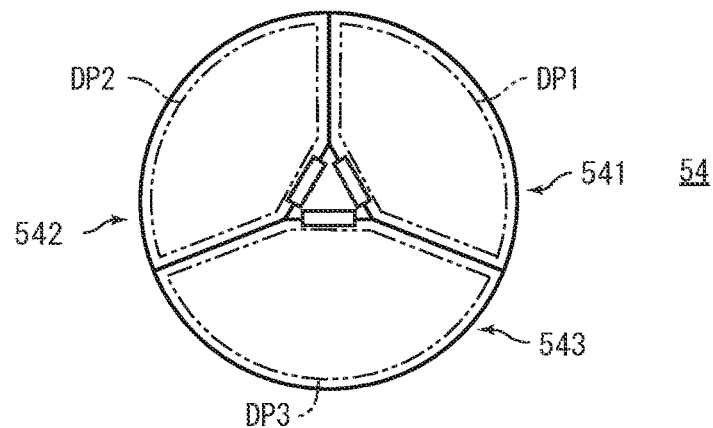
FIG. 25 is a plan view illustrating an exemplary display device that includes three display units.

FIG. 25 is a plan view illustrating a configuration of a display device 54 as an exemplary display device that includes three display units. The display device 54 includes a first display unit 541, a second display unit 542, and a third display unit 543. The display device 54, as a whole, has a circular outer shape when viewed in a plan view. The first display unit 541, the second display unit 542, and the third display unit 543 display images in the first display area DP1, the second display area DP2, and the third display area DP3, respectively.

Figure 26:
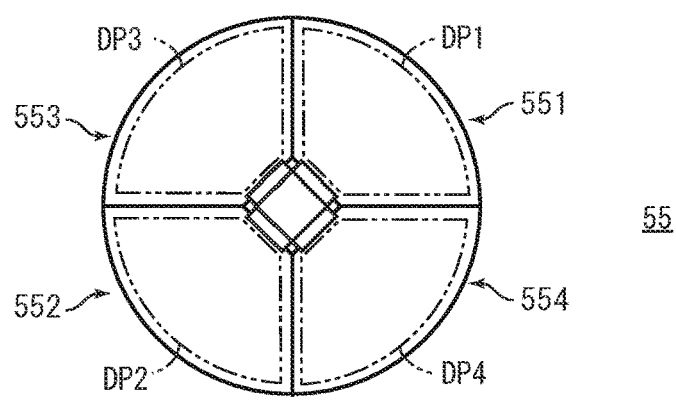
FIG. 26 is a plan view illustrating an exemplary display device that includes four display units.

FIG. 26 is a plan view illustrating a configuration of a display device 55 as an exemplary display device that includes four display units. The display device 55 includes a first display unit 551, a second display unit 552, a third display unit 553, and a fourth display unit 554. The display device 55, as a whole, has a circular outer shape when viewed in a plan view. The first display unit 551, the second display unit 552, the third display unit 553, and the fourth display unit 554 display images in a first display area DP1, a second display area DP2, a third display area DP3, and a fourth display area DP4, respectively.

Figure 27:
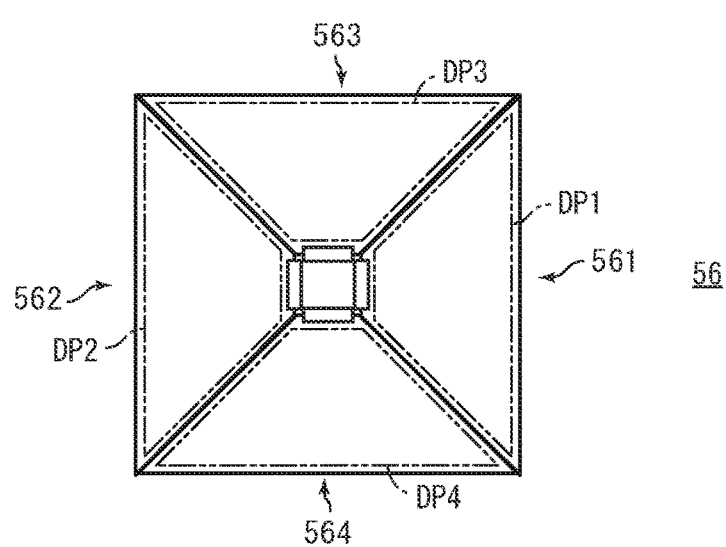
FIG. 27 is a plan view illustrating another exemplary display device that includes four display units.

FIG. 27 is a plan view illustrating a configuration of a display device 56 as another exemplary display device that includes four display units. The display device 56 includes a first display unit 561, a second display unit 562, a third display unit 563, and a fourth display unit 564. The display device 56, as a whole, has a rectangular outer shape when viewed in a plan view. The first display unit 561, the second display unit 562, the third display unit 563, and the fourth display unit 564 display images in a first display area DP1, a second display area DP2, a third display area DP3, and a fourth display area DP4, respectively.

In the cases of the examples illustrated in FIGS. 25 to 27 as well, no mounting area is provided along the outer circumference of the display device, and therefore, the circumferential frame part of the display device can be made narrow. Besides, the outer circumference thereof can be formed in an arbitrary shape.

In the foregoing descriptions of the embodiments, examples in which a liquid crystal display panel is used as a display unit are described. In place of the liquid crystal display panel, however, an organic EL panel, an electrophoresis panel, a micro-electric mechanical system (MEMS) panel, or the like may be used.

Further alternatively, a plurality of display units may be formed with display panels of different types, respectively. For example, one of the display units may be formed with a light-emission-type display panel such as a transmission-type liquid crystal panel or an organic EL panel, and another display unit may be formed with a non-light-emission-type display panel such as a reflection-type liquid crystal or an electrophoresis panel. In this case, during standby time, the minimum information (date/time and the like) is displayed by the non-light-emission-type display panel, while the display is turned off with the power source of the light-emission-type display panel being turned off, whereby the electric power saving can be achieved while only minimum information is displayed.

The invention claimed is:

1. A display device comprising:
a first display unit including a first substrate;
a second display unit including a second substrate that is arranged so as to be adjacent to the first substrate in an in-plane direction of the first substrate;
a first line group that supplies a signal to the first display unit, the first line group passing through between the first substrate and the second substrate; and
a second line group that supplies a signal to the second display unit, the second line group passing through between the first substrate and the second substrate,
a first flexible substrate on which the first line group is formed; and
a second flexible substrate on which the second line group is formed; wherein
the first display unit includes a mounting area to which the first line group is connected, in a part that is opposed to the second display unit,
the second display unit includes a mounting area to which the second line group is connected, in a part that is opposed to the first display unit,
the first substrate includes a first straight-line portion along an outline thereof,
the first flexible substrate is arranged along an edge of the first substrate that includes the first straight-line portion,
the second substrate includes a second straight-line portion along an outline thereof,
the second flexible substrate is arranged along an edge of the second substrate that includes the second straight-line portion,
the first display unit further includes a first counter substrate that is arranged on a viewer side with respect to the first substrate, so as to be opposed to the first substrate,
the second display unit further includes a second counter substrate that is arranged on a viewer side with respect to the second substrate, so as to be opposed to the second substrate,
the first flexible substrate is connected to the first substrate,
the second flexible substrate is connected to the second counter substrate,
the first flexible substrate and the first substrate are connected with each other by a first connection member,
the second flexible substrate and the second counter substrate are connected with each other by a second connection member, and
the following expression is satisfied:

$$t\_A2 \geq t\_B2 + t\_FPC \times 2 + t\_ACF \times 2$$

where "t_A2" represents a thickness of the first counter substrate, "t_B2" represents a thickness of the second counter substrate, "t_FPC" represents each thickness of the first flexible substrate and the second flexible substrate, and "t_ACF" represents each thickness of the first connection member and the second connection member.

2. The display device according to claim 1, further comprising:
a translucent front panel that is arranged on a viewer side with respect to the first display unit and the second display unit, so as to cover the first display unit and the second display unit.

3. The display device according to claim 2, further comprising:
a colored section that is formed on the front panel, the colored section being formed between a display area of the first display unit and a display area of the second display unit, when viewed in a plan view.

4. The display device according to claim 1,
wherein the display device has a circular or oval outer shape in plan view.

5. The display device according to claim 1, further comprising:
a control circuit that supplies a signal to the first line group and the second line group,
wherein the control circuit is configured to cause a continuous image to be displayed on the first display unit and the second display unit.

6. An apparatus comprising the display device according to claim 1.

7. A display device comprising:
a first display unit including a first substrate;
a second display unit including a second substrate that is arranged so as to be adjacent to the first substrate in an in-plane direction of the first substrate;
a first line group that supplies a signal to the first display unit, the first line group passing through between the first substrate and the second substrate;
a second line group that supplies a signal to the second display unit, the second line group passing through between the first substrate and the second substrate;
a first flexible substrate on which the first line group is formed; and
a second flexible substrate on which the second line group is formed, wherein
the first display unit includes a mounting area to which the first line group is connected, in a part that is opposed to the second display unit,
the second display unit includes a mounting area to which the second line group is connected, in a part that is opposed to the first display unit,
the first substrate includes a first straight-line portion along an outline thereof,
the first flexible substrate is arranged along an edge of the first substrate that includes the first straight-line portion,
the second substrate includes a second straight-line portion along an outline thereof,
the second flexible substrate is arranged along an edge of the second substrate that includes the second straight-line portion,
the first flexible substrate is connected to the first substrate,
the second flexible substrate is connected to the second substrate,
the first flexible substrate is arranged so as to intersect with a virtual line obtained by extending a line along the straight-line portion of the second substrate, and
the second flexible substrate is arranged so as to intersect with a virtual line obtained by extending a line along the straight-line portion of the first substrate.

* * * * *